(No Model.)
P. SHELLENBACK.
MACHINE FOR FINISHING ECCENTRIC SURFACES.
No. 526,639. Patented Sept. 25, 1894.
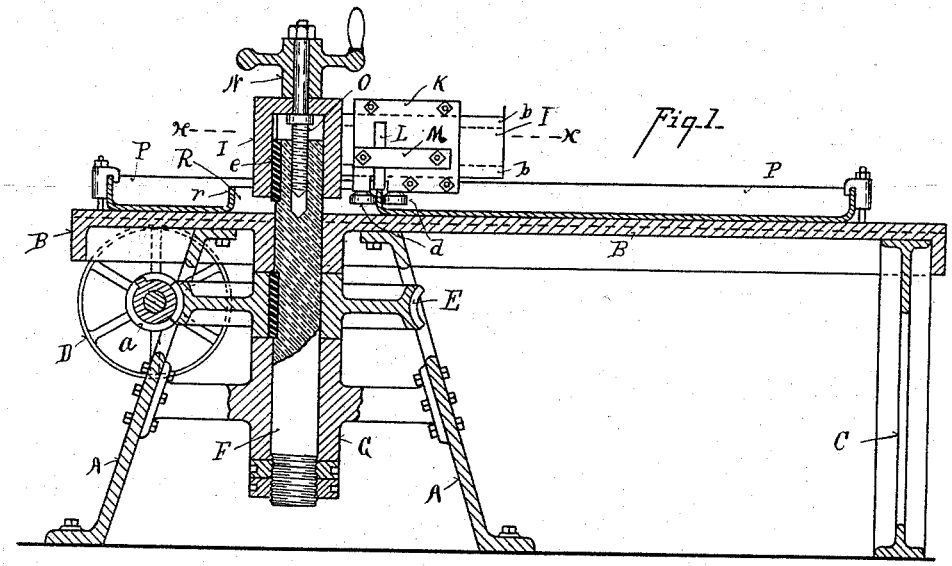
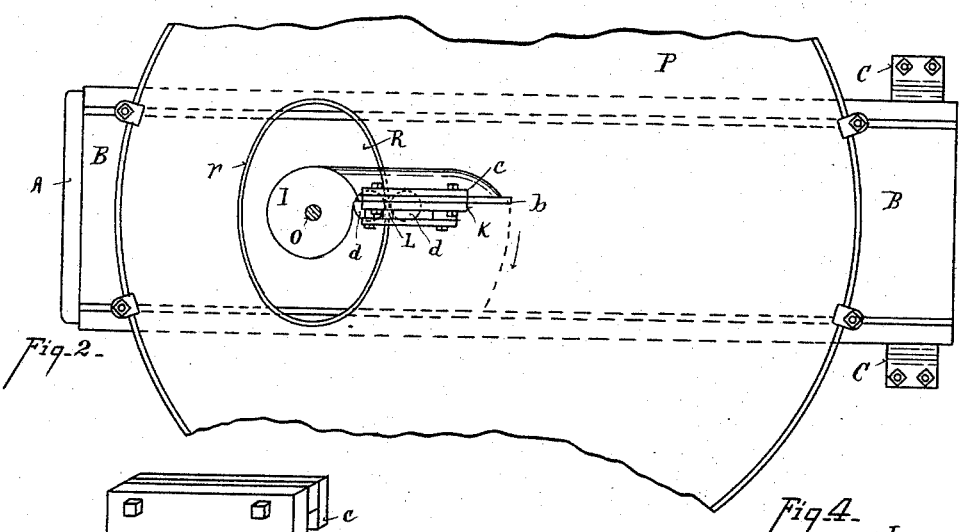
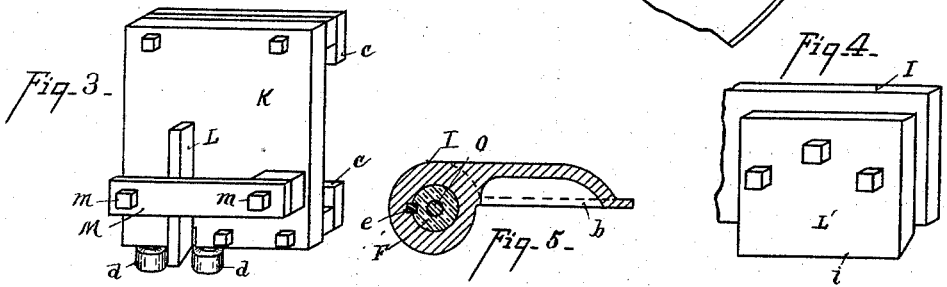
Attest
C. W. Miles
Oliver P. Kaiser
Inventor
P. Shellenback
By Woods Boyd, Attys.

UNITED STATES PATENT OFFICE.

PETER SHELLENBACK, OF LIBERTY, INDIANA, ASSIGNOR TO THE LIBERTY MANUFACTURING COMPANY, OF SAME PLACE.

MACHINE FOR FINISHING ECCENTRIC SURFACES.

SPECIFICATION forming part of Letters Patent No. 526,639, dated September 25, 1894.

Application filed March 20, 1894. Serial No. 504,441. (No model.)

*To all whom it may concern:*

Be it known that I, PETER SHELLENBACK, a citizen of the United States, residing at Liberty, in the county of Union and State of Indiana, have invented certain new and useful Improvements in Machines for Finishing Eccentric Surfaces, of which the following is a specification.

My invention relates to a machine for finishing eccentric or elliptically shaped flanges, such as the man-holes for boiler heads, and other similar articles.

The object of my invention is to provide a tool which can be driven from the center of the ellipses and perform the work.

The various features of my invention are fully set forth in the description of the accompanying drawings making a part of this specification, in which—

Figure 1 is a central vertical section of my improvement. Fig. 2 is a plan view of Fig. 1 with the hand-wheel removed. Fig. 3 is a perspective view of the reciprocating cutter head. Fig. 4 is a perspective view of a modification of Fig. 3. Fig. 5 is a section through the traveling head, on line $x$, $x$, Fig. 1.

A represents the supports for the main frame of the machine; B, a table mounted thereon; C, legs for supporting the rear end of the table.

D represents the driving wheel.

$a$ represents a worm gear on the shaft of the driving wheel D.

E represents a worm wheel keyed to the upright spindle F and is driven by the worm $a$. The spindle F is journaled in the upright column G which supports and journals the same below the table. On the top of the spindle F is journaled and driven a turret I.

$b$, $b$, represent ways formed on a rigid arm which projects radially from the turret I.

K represents a reciprocating cutter head. It is provided with gibs $c$ for holding it upon the ways $b$ on which it reciprocates as will be hereinafter described.

L represents the cutting knife which is secured in position by clamp M, and screw bolts $m$.

$d$, $d$, represent anti-friction rollers journaled on the bottom of the cutter head.

$e$ represents a feather for securing the turret I to the top of the spindle so that it may be raised and lowered.

N represents a hand wheel engaging with the screw rod O stepped in the top of the spindle for raising and lowering the turret and with it the cutter head K supported by said turret. The turret and cutter head are removable by turning out the screw rod $o$ and lifting the turret head off.

The mode of operation is as follows: P represents a boiler head suitably flanged. R represents a man-hole which is usually formed in the following manner: A series of holes is punched through the metal. Then a flange is turned up from the burred periphery thus formed. It is essential to have this flange finished down smooth so as to make a proper joint. My tool accomplishes this in the following manner: The turret head is lifted off of the spindle and the man hole of the boiler head placed over the spindle, and the turret head is placed in position. The turret I and cutter head K are lowered so as to bring the rollers $d$, $d$, each side of the flange $r$ of the man hole. The tool is adjusted in position by the hand wheel N so as to take a cut off of the flange $r$ when the spindle is revolved. The rollers $d$, $d$, hold the tool above the top of the flange $r$, the cutter head K traveling back and forth on the ways to accommodate itself to the eccentricity of the man hole R. The said knife L shears off the vertical edge of the flange $r$ as it is driven around by the spindle.

Modification: I have shown in Fig. 4 a modified form of cutter head which carries a knife L′ sufficiently wide across the face of the bit $i$ of the tool to sweep across the flange $r$ without a reciprocating motion of the tool stock which in this case is rigidly connected to the turret I.

Having described my invention, what I claim is—

1. In a finishing tool, the combination of a table B supported upon a frame provided with a vertically arranged tubular bearing G, the spindle F mounted in said bearing and projecting up through said table, the turret-head I mounted on the upper end of the spindle and carrying a vertically arranged shearing knife adapted to plane the edge of a man-hole flange on a metal plate supported on said table, and gearing located below the table and adapted to drive the spindle and turret-head, substantially as described.

2. In a finishing tool, the combination of a table B supported upon a suitable frame, the vertically arranged spindle F journaled below the table and projecting up through the same, the turret-head I mounted on the upper end of the spindle and provided with the radial ways $b, b$, the cutter-head K radially adjustable on said ways, a vertically arranged shearing knife L attached to said cutter-head and adapted to plane the edge of a man hole flange on a boiler-head or metal plate supported on said table, and gearing located below the table and adapted to drive the spindle and turret-head, substantially as described.

3. In a finishing tool, the combination of a table B supported upon a suitable frame provided with a vertically arranged tubular bearing G, the spindle F mounted in said bearing and projecting up through the table, a turret-head I mounted on the spindle and provided with rigid radially arranged ways $b, b$, the reciprocating head K radially adjustable on said ways, the vertically arranged shearing knife L attached to said reciprocating head, the adjusting mechanism N O for raising and lowering the turret-head, and gearing located below the table and adapted to rotate the spindle and attached turret-head, substantially as described.

4. In a finishing tool, the combination of the revolving turret I, the ways $b, b$, the reciprocating cutter head K, the knife L and guide rollers $d, d$, upon either side of the said knife, substantially as described.

In testimony whereof I have hereunto set my hand.

PETER SHELLENBACK.

Witnesses:
T. SIMMONS,
W. R. WOOD.